United States Patent
Polcyn

(10) Patent No.: US 6,594,269 B1
(45) Date of Patent: *Jul. 15, 2003

(54) INTERACTIVE INFORMATION TRANSACTION PROCESSING SYSTEM ON IP TELEPHONY PLATFORM

(75) Inventor: Michael J. Polcyn, Allen, TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/163,234

(22) Filed: Sep. 29, 1998

Related U.S. Application Data

(63) Continuation of application No. 08/719,163, filed on Sep. 24, 1996, now Pat. No. 6,195,357.

(51) Int. Cl.[7] .............................. H04L 12/66
(52) U.S. Cl. .................. 370/401; 370/352; 379/88.17
(58) Field of Search .............................. 370/352–356, 370/400, 401; 379/88.17

(56) References Cited

U.S. PATENT DOCUMENTS

| | | | |
|---|---|---|---|
| 4,100,377 A | 7/1978 | Flanagan | 179/15 |
| 4,771,425 A | 9/1988 | Baran et al. | 370/85 |
| 4,969,184 A | 11/1990 | Gordon et al. | 379/100 |
| 5,526,353 A | 6/1996 | Henley et al. | 370/60.1 |
| 5,608,786 A | 3/1997 | Gordon | 379/100 |
| 5,610,910 A | 3/1997 | Focsaneanu et al. | 370/351 |
| 5,754,631 A * | 5/1998 | Cave | 379/88 |
| 6,195,357 B1 * | 2/2001 | Polcyn | 370/401 |

OTHER PUBLICATIONS

PCT/US97/16830—International Search Report—U.S. Patent Office.
INETPhone: Telephone Services and Servers on Internet—C. Yang—Pages 1–6.

* cited by examiner

*Primary Examiner*—Hassan Kizou
*Assistant Examiner*—John Pezzlo
(74) *Attorney, Agent, or Firm*—Fulbright & Jaworski L.L.P.

(57) ABSTRACT

A system and method to enable a wide user community to be universally networked in voice communication. Server/IVR 100 receives voice communications from users employing a variety of device types, primarily computers and telephones. These voice communications may be in either asynchronous format, incoming from data grade networks such as the Internet 140, or synchronous format, incoming from standard telephony networks such as SPN 109. Server/IVR 100 functionality seamlessly integrates these voice communications and provides point-to-point, conferenced or broadcast connections of multiple users regardless of user device or asynchronous/synchronous connection format. Server/IVR 100 may also selectively call up automated speech resources ("robots") to be placed in voice communication with users.

34 Claims, 2 Drawing Sheets

INTERACTIVE INFORMATION TRANSACTION PROCESSING SYSTEM ON IP TELEPHONY PLATFORM

RELATED APPLICATIONS

The present application is a continuation of co-pending and commonly assigned U.S. patent application Ser. No. 08/719,163, entitled "INTERACTIVE INFORMATION TRANSACTION PROCESSING SYSTEM WITH UNIVERSAL TELEPHONY GATEWAY CAPABILITIES," filed Sep. 24, 1999 now U.S. Pat. No. 6,195,375B1, the disclosure of which is hereby incorporated by reference herein.

TECHNICAL FIELD OF THE INVENTION

This invention relates generally to telecommunications systems, and more specifically to an interactive information transaction processing system in which remote computer users communicating by voice over asynchronous Internet-type connections may be seamlessly networked with remote telephone users communicating by voice over synchronous telephony connections in point-to-point, conferencing and broadcast environments. Users may also be networked with automated speech resources ("robots").

BACKGROUND OF THE INVENTION

There has been a dramatic increase in recent years of the availability of public digital grade networks, such as the World Wide Web ("WWW") on the Internet, to exchange information in voice format. Applications have been generally limited so far, however, to specific preselected person-to-person conversations, however, like an "Internet phone."

Numerous new and useful applications would become possible, however, if full duplex asynchronous voice conversations, such as may be exchanged over the WWW, could be seamlessly integrated with synchronous conversations, such as may be exchanged over the Switched Public Network ("SPN") and other more traditional voice-carrying networks. In this way, a very wide user community would become immediately voice-networked, since multiple devices (primarily telephones and computers) would potentially be supported at the same time to facilitate, for example, point-to-point communications, or multi-party broadcasts, or multi-party conferences.

Such connectivity would readily address needs in the art such as allowing a WWW user (with full duplex asynchronous voice capability) to be selectively connected to a live agent who was also serving synchronously-connected remote users.

For example, a WWW user might be accessing a website offering catalog-type merchandise and receiving automated voice messages that describe the products and facilitate purchase thereof. Advantageously, these automated voice messages would be available in parallel with traditional visual functionality accessible through standard web browser technology. This session would be immediately enhanced if the user could selectively call up a live agent to intervene. Alternatively, the user might want to go directly to the live agent and bypass automated speech functionality. At the point when intervention by a live operation was desired, it would be useful if the user could call the agent up by means known in the art, such as clicking a mouse on a specific screen zone, or saying "operator." Such agent call-up could, for example, be enabled by technology disclosed in commonly assigned U.S. patent application "SYSTEM AND METHOD FOR ESTABLISHING REAL-TIME AGENT POOL BETWEEN COMPUTER SYSTEMS," U.S. Ser. No. 08/767,525, filed concurrently herewith, the disclosure of which application is hereby incorporated herein by reference.

It would then be extremely useful if the live agent could also serve synchronously-connected remote users, as well as asynchronously-connected remote users calling in from the Internet. In this way, for example, live agents could be drawn from a pool also available to other users over standard telephony connections.

Further, it would be useful if the remote Internet user could also be directed to a live agent physically distant from the website or agent pool. In this way, a remote specialist (such as a loan officer in the bank website example) could be called in occasionally to answer very specific questions, while routine business was being handled by general agents.

In an alternate example, it would be useful if multiple remote users communicating through computer voice functionality over, for example, the Internet, could be conferenced with multiple remote users communicating through standard synchronous telephony links. Large scale conference calls would be facilitated, such as for "electronic town hall meetings". Alternatively, a feed from the conference could be sent to be broadcast, thereby enabling wide audience participation in a radio talk show.

SUMMARY OF THE INVENTION

At its broadest conceptual level, the present invention comprises server and Interactive Voice Response ("IVR") functionality that receives and selectively interconnects incoming voice communications. These communications may be either asynchronously or synchronously disposed, and selective interconnection may be made regardless of the user device type through which the user is communicating.

The IVR side of the server/IVR functionality enables interconnection of the various communications through switching. The IVR functionality further interprets communications received over asynchronous connections (such as via the Internet) to be understandable to users connected over synchronous connections (such as via the SPN), and vice versa.

Server architecture and functionality is provided according to the types of users and connections served. For example, an HTTP server will typically be required to serve Internet users communicating through WWW browsers currently known in the art. Other types of servers may be required to serve other asynchronous connections. Alternatively, a Private Branch Exchange ("PBX") or Automated Call Distributor ("ACD") may be used to serve multiple synchronous connections.

In a presently preferred embodiment, the IVR may be an automated voice resource known in the art, such as Inter-Voice's "Onevoice" platform. Ports on the IVR receive individual communications, and resources in the IVR perform processing to make communications in one format (e.g. asynchronous) understandable to communications in other formats (e.g. synchronous). Robot resources in the IVR also allow programmable automated speech to be communicated to users connected thereto. Further, switching in the IVR enables point-to-point connections or multi-party conferencing as required.

It will be understood that consistent with the present invention, the IVR may be either collocated with the server, or distant therefrom. When separated, however, server/IVR connections are required suitable to serve the type of communications being provided to the IVR by the server.

It will be further understood that to take advantage of the present invention, a computer user typically requires a multimedia-grade computer, including speakers, sound card, microphone and full duplex voice-enabling software. Alternatively, the computer user may use a lower capability computer in combination with a traditional telephone.

The present invention thus provides capability for an Internet-connected user to selectively call up a live agent to intervene. The live agent may communicate with user regardless of whether the agent's connection is an asynchronous or synchronous link.

It will be seen that the live agent may reside either locally or remotely from the website and/or IVR. The IVR may connect the user to live agent in voice communication over another asynchronous link. Alternatively, the IVR may place a synchronous telephony call to a live agent through Private Branch Exchange ("PBX") or Automated Call Distribution (ACD") switching to enable a local connection, or through the Switched Public Network ("SPN") to enable a remote connection. In this way, for example, the IVR may place the call, responsive to the instructions of the user, to either a general agent resident locally, or a specialist agent resident remotely.

It is therefore a technical advantage of the present invention to enable a wide user community to be in voice communication. In achieving this advantage, the present invention enables seamless connectivity of multiple types of user device over both synchronous and asynchronous connections. This connectivity is further disposed to be point-to-point, conferenced or broadcast.

It is a further technical advantage of the present invention to enable remote users connected to an IVR over a digital network, such as the Internet, to selectively call up intervention by a live agent and then engage in full duplex voice communication with that agent, regardless of whether that agent is connected to the IVR by synchronous or asynchronous links. Such a connection to a live agent through standard synchronous telephony links may thus be enabled by architecture, such as PBX or ACD systems, or over the SPN. In this way, agents may be called in from a pool also available to other users communicating by traditional synchronous telephone terminals.

It is a still further technical advantage of the present invention for the IVR to enable, in addition to point-to-point connections, multi-party conferencing between asynchronously-connected and synchronously-connected parties. In this way, large conference calls may be enabled, or a feed from the conference may be broadcast to facilitate a radio talk show.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
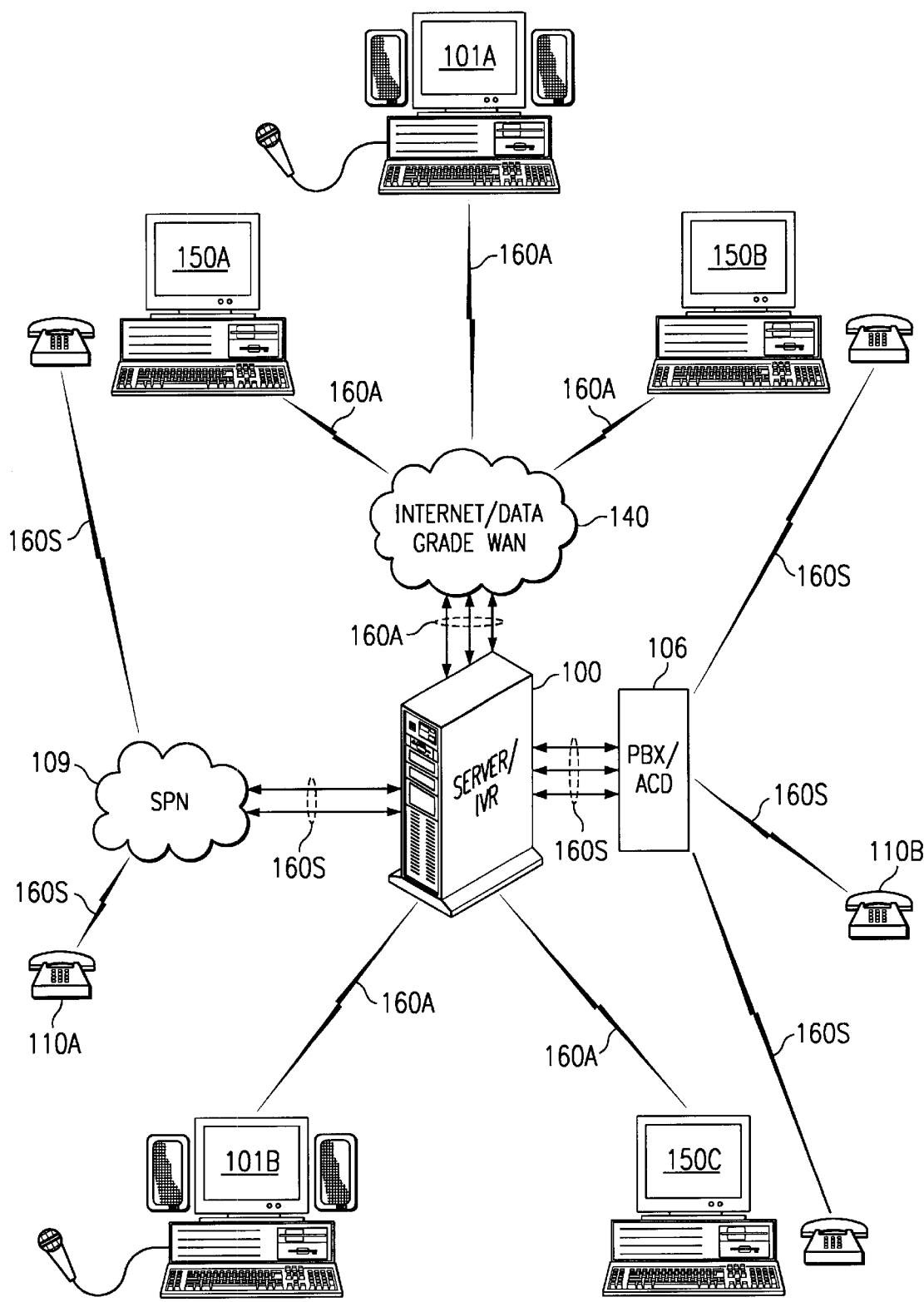
FIG. 1 depicts a functional block diagram illustrating universal communication according to the present invention between synchronously-connected and asynchronously-connected parties as enabled by server/IVR 100.

Turning first to FIG. 1, a functional block diagram illustrates the concept of the present invention, Server/IVR 100 is the focal component, and interconnects various originating and terminating parties.

Server/IVR 100 is a combination of server functionality and IVR functionality that may be embodied in various forms. As described in earlier sections, an IVR receives voice communications from all connecting parties regardless of whether disposed to be transmitted along asynchronous or synchronous links. A suitable IVR to fulfill this function is InterVoice's "Onevoice" platform. The IVR also provides switching and conferencing functionality to enable interconnection of any received communications as required. Further, the IVR advantageously provides automated speech functionality so that recorded messages may also be selectively introduced into voice communications, as controlled by the IVR. The IVR also provides processing that enables both asynchronously- and synchronously-connected parties to participate in full voice duplex exchanges.

Server functionality at Server/IVR 100 complements the above-described IVR functionality to enable non-voice communication, where supported (such as in computers and televisions), to continue alongside the voice communication. For example, a user in voice communication through a multimedia PC will typically have been previously required to log on to some kind of resource for voice communication to be initiated. Over the Internet, this resource might be a website. The server side of Server/IVR 100, acting as this resource, directs voice communications received through the PC back and forth to the IVR. Further, when supported by the server functionality and the remote PC, the server side may advantageously allow the remote PC user to continue non-voice interactivity with the website while voice communication is being directed to and from the IVR.

Consistent with the present invention, Server/IVR 100 may comprise separate server(s) and IVR(s) integrated together, either locally or remotely, or collocated in one box. It will be understood that Server/IVR 100 may also operate in combination with separate host control processing and/or archival data on mass storage devices.

Referring again to FIG. 1, multimedia-grade PCs 101A and 101B are connected to Server/IVR 100 and equipped to enable full voice duplex communication over asynchronous connections 160A. Typically, PCs 101A and 101B will comprise speakers, a microphone, sound card, and software enabling voice duplex communication. In the case of PC 101A, connection to Server/IVR 100 is via the Internet or another data grade Wide Area Network ("WAN") 140. In the case of PC 101B, connection to Server/IVR 100 is via direct asynchronous connection, or possibly a Local Area Network ("LAN") (not illustrated). In this way, any user of a suitably equipped PC connected to the Internet, or another WAN, or a particular LAN, may come into full duplex voice communication with Server/IVR 100. At the same time, non-voice communication (such as visual displays) may also continue on the user's multimedia PC.

Telephones 110A and 110B are also connected to Server/IVR 100. In this case, however, it will be understood that telephones 110A and 110B are linked to Server/IVR 100 over synchronous connections 160S. Telephone 110A is connected to Server/IVR 100 via Switched Public Network ("SPN") 109. In this way, any user of a telephone attached to the SPN may come into duplex voice communication with Server/IVR 100. Further, telephone 110B is connected to Server/IVR 100 via Private Branch Exchange ("PBX") or Automated Call Distribution ("ACD") functionality 106. In this way, standard telephony users in agent pools or other resources local to Server/IVR 100 may become connected.

With further reference to FIG. 1, PC/telephone combinations 150A, 150B and 150C reflect connectivity to Server/IVR 100 that enables users of lower capability PCs to have duplex voice communication with Server/IVR 100 via telephone as well as non-voice communication through the PC. In this way, interaction similar to that available to multimedia-grade PCs 101A and 101B becomes available. In PC/telephone combination 150A, remote users connect their PCs via Internet/other WAN 140 to Server/IVR 100, and their telephones via SPN 109. In combination 150B, closer users connect their PCs via Internet/other WAN 140 and their telephones via PBX/ACD functionality 106. In combination 150C, local users connect their PCs to Server/IVR 100 directly, or by LAN (not illustrated), and their telephones by PBX/ACD functionality 106. It will be seen from FIG. 1 that appropriate asynchronous connections 160A and synchronous connections 160S are required according to the user device connected.

As described above, Server/IVR 100 thus enables interconnection and intercommunication of any originating or terminating party connected to Server/IVR 100. Both telephone and computer user devices are supported. The IVR side of Server/IVR 100 enables asynchronous/synchronous translation where required, as well as switching to enable point-to-point connection, conferencing, or broadcast as required. The server side of Server/IVR 100 feeds asynchronous voice signals to the IVR as required, and advantageously also enables non-voice interactivity with websites and other similar server-controlled resources while voice communication through the IVR is in progress.

Although not illustrated, it will be understood that consistent with the present invention, other user devices may also be supported to enable a wider user community to become networked through Server/IVR 100. For example, instead of a limited capability PC, a cable television could also be used in combination with a telephone to combine simultaneous voice and non-voice communication. The lines connecting the cable television to Server/IVR 100 may be synchronous or asynchronous as required by the cable television. Other formats of voice and non/voice communication may also be connected.

A wide range of embodiments becomes available for the foregoing interconnectivity and intercommunication. In a first embodiment (described in greater detail below with reference to FIG. 2), PC users doing business on the Internet or other WANs may receive customer service from an agent pool through the Internet/WAN connection, where that agent pool is also disposed to serve non-Internet/WAN users at the same time.

Alternatively, in a second embodiment, Server/IVR 100 may bring together a multi-party conference, drawing participants from a large user community using various user devices connected through diverse links. A controller at Server/IVR 100 may moderate the conference. Such a conference has applications in large investor meetings for corporations or "electronic town hall" meetings where it may be desirable for many parties to listen, but only selected parties to speak. Further, non-voice signals in the communications, such as DTMF, or a particular keyboard or mouse click sequence, may be received from parties at Server/IVR 100 and counted as "votes."

Alternatively, in a third embodiment, a feed from Server/IVR 100 may be routed to be broadcast over radio, television or other mass medium. An application of this would be a radio talk show. In this way, an even wider user community could hear voice communications conferenced by Server/IVR 100 over the mass medium, although only those calling in by computer or telephone would get to speak. Again, a moderator would control the conference at Server/IVR 100.

Figure 2:
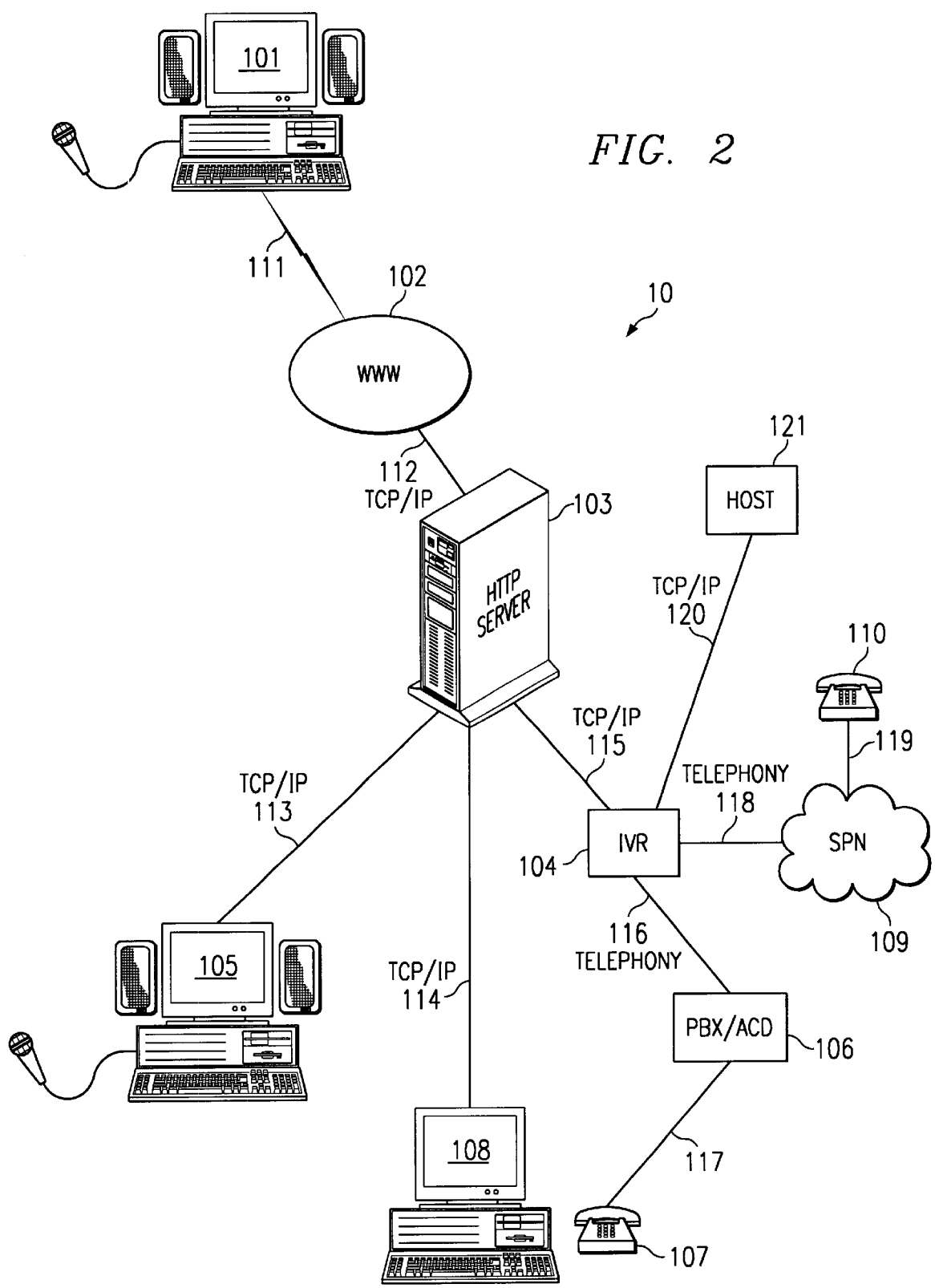
FIG. 2 depicts a functional block diagram illustrating exemplary architecture and topology of a preferred embodiment of the present invention, in which a World Wide Web ("WWW") user may call up a live agent disposed to serve both synchronously- and asynchronously-connected remote users.

With reference now to FIG. 2, the first embodiment as described briefly above will now be described in detail. System 10 comprises a remote user's PC 101, advantageously a desktop multimedia PC with speakers, a sound card and a microphone, running a full duplex voice-enabled web browser, standard in the art, and connected to World Wide Web ("WWW") 102. PC 101's connection to WWW 102 will be understood to be a standard Internet connection 111 known in the art, such as provided by many existing Internet service providers ("ISPs"). Connection 111 may be by any means, such as dial-up or dedicated link, so long as the data transfer capability of Internet connection 111 supports full duplex voice.

WWW 102 in turn is connected to HTTP server 103 via a further Internet access connection 112 standard in the art. Interactive Voice Response unit ("IVR") 104 is connected to HTTP server 103 via TCP/IP link 115. IVR 104 is an automated voice resource known in the art, such as InterVoice's "Onevoice" platform. With reference back to FIG. 1, HTTP server 103 and IVR 104 provide the general Server/IVR 100 functionality required to enable this particular embodiment. As noted above, however, Server/IVR 100 may comprise other combinations of server, IVR, and/or interconnecting architecture within the scope of the present invention in fulfilling Server/IVR 100 functionality appropriate to other embodiments.

Referring again to FIG. 2, it will thus be seen that the user of PC 101 may now exchange full duplex voice information with IVR 104. For example, the owner of HTTP server 103 may be a financial institution, such as a bank. Upon connection over WWW 102 to HTTP server 103, the user will typically be presented with a suite of interrelated web pages, such as is standard in the art. Among the options in this suite selectable by the user of PC 101 is the facility to obtain account balance information in voice as well as visual format. The user selects this option and is connected to IVR 104. IVR 104 then interacts with the user, in automated mode, exchanging information with the user responsive to the user's instructions.

For example, IVR 104 may greet the user with a statement such as "Welcome to First Bank's automated voice teller. Please say your account number." The user then says her account number, which IVR 104 receives, interprets, and verifies advantageously with reference to information stored on host 121. The connection 120 between host 121 and IVR 104 may be by either net, or bus, or any other similar means known in the art. The transaction typically is enabled by HTTP server 103 issuing a CGI command via TCP/IP link 115 to IVR 104. IVR 104 then requests information or enables processing at host 121, which sends responsive information back to IVR 104. The information is formatted by HTTP server 103 and sent back to the user via WWW 102, advantageously including an additional automated voice message.

A further exchange between the user and IVR 104 may then occur to validate a PIN number, the PIN again solicited by IVR 104 and spoken back by the user in full voice duplex format. Assuming the user is authorized, IVR 104 then solicits the next action, to which the user may say "account balance." Again with reference to information stored on host 121, IVR 104 plays back to the user a voice response such as "As of January 31, your account balance was nine-hundred sixty-two dollars and fifteen cents."

It will be appreciated that consistent with the present invention, many similar transactions between the user and IVR 104 may be accomplished in automated mode, and in full voice duplex format. Further, it will be appreciated that the present invention is not at all limited to the exemplary application of a bank teller as described above. It will be seen that the exchange of information between the user and IVR 104, in automated mode and in full voice duplex format, has many applications whenever a user desires to exchange information remotely with a data resource.

Let it now be assumed that during an automated session with IVR 104 as described above, the user needs the help of a live agent. With reference again to FIG. 2, three alternatives are illustrated by which such a live agent may be disposed to intervene.

Premise-based PC 105 is another multimedia-capability PC with speakers, a sound card, a microphone and a full duplex voice-enabled web browser, compatible to converse with user's PC 101. A live agent attends premise-based PC 105, and is connected to HTTP server 103 via TCP/IP link 113. It will be understood that when the user desires to speak with a live agent, she may enable the connection by, for example, "clicking" her mouse on a predetermined zone on the screen. At this point, HTTP server 103 redirects the user to premise-based PC 105. Such live agent call-up may be enabled by above-referenced commonly assigned U.S. patent application for "SYSTEM AND METHOD FOR ESTABLISHING A REALTIME AGENT POOL BETWEEN COMPUTER SYSTEMS."

Alternatively, the voice portion of the user's communication with a live agent may be directed by HTTP server 103 and IVR 104 through to telephone terminal 107. This connection may be made through telephone lines and switching standard in the art, advantageously as controlled by a Private Branch Exchange ("PBX") or Automated Call Distribution ("ACD") resources 106. In this alternative, it will be understood that IVR 104 acts as an interface between the requirements of the TCP/IP link 115 and standard telephone lines 116 and 117. TCP/IP is a packetized protocol for asynchronous transfer of digital information over networks such as the Internet. To enable, the interface to connect to standard telephone lines 116 or 117, IVR 104 places a standard telephone call and then converts the packetized voice data exchanged over TCP/IP link 105 into an established synchronous conversation format accepted by telephony architecture standard in the art. It should be further noted that the agent at telephone terminal 107 is also advantageously assisted by standard PC 108, connected to HTTP server 103 to receive non-audio information through a further TCP/IP link 114.

A further advantage of routing the voice portion of the communication through IVR 104 and PBX/ACD resources 106 is that three-way conferencing between the user, the agent, and automated functions in IVR 104 now becomes possible. Such automated functions include IVR 104 being disposed to play messages that may be heard and discussed by both live parties, or IVR 104 disposed to record both sides of the live conversation. This type of three-way conferencing may be enabled at IVR 104, in combination with host 121, using switching and conference bridge technology standard in the art, or by means disclosed in commonly assigned U.S. Pat. No. 5,754,631, entitled "VOICE RESPONSE UNIT HAVING ROBOT CONFERENCE CAPABILITY ON PORTS," issued May 19,1998, the disclosure of which application is also incorporated herein by reference.

A third alternative to enable agent intervention is to connect a remote agent at telephone terminal 110 via switched public network ("SPN") 109. Again, this connection is made by switching through conventional telephone lines 118 and 119, taking advantage of telephony architecture standard in the art. An example of use of telephone terminal 110 might be if it becomes desirable for the user to be connected to a specialist, such as a manager or a loan officer in the bank example. In this case, IVR 104 would switch the user's communication over SPN 109 directly through to the specific person desired. As illustrated, the desired person may not always have the facility to be computer-connected to the conversation. Communication may continue adequately, however, in voice mode only, again optionally with the advantage of three-way conferencing resources that may be included in IVR 104's automated functions.

Although the present invention and its advantages have been described in detail, it should be understood that various changes, substitutions and alterations can be made herein without departing from the spirit and scope of the invention as defined by the appended claims.

I claim:

1. A telephony gateway in which a plurality of asynchronously-configured telephony devices are each disposed to exchange voice information according to asynchronous protocols, the gateway comprising:

a connecting resource, the connecting resource disposed to couple first selected ones of the asynchronously-connected telephony devices so as to enable voice communication therebetween; and means, responsive to the connecting resource, for coupling second selected ones of the asynchronously-connected telephony devices to a robotic peripheral so as to enable voice communication therebetween.

2. The gateway of claim 1, in which said asynchronous protocols include TCP/IP.

3. The gateway of claim 1, in which the plurality of asynchronously-configured telephony devices includes at least one computer with telephony capability.

4. The gateway of claim 1, in which the robotic peripheral provides automated speech resources.

5. The gateway of claim 1, in which the connecting resource is operable to couple asynchronously-configured telephony devices and the robotic peripheral over the Internet so as to enable voice communication therebetween.

6. The gateway of claim 1, in which the connecting resource is operable to couple asynchronously-configured telephony devices and the robotic peripheral over a Wide Area Network other than the Internet so as to enable voice communication therebetween.

7. The gateway of claim 1, in which the connecting resource is operable to couple asynchronously-configured telephony devices and the robotic peripheral over a Local Area Network so as to enable voice communication therebetween.

8. The gateway of claim 1, in which the connecting resource is operable to couple asynchronously-configured telephony devices and the robotic peripheral via a direct link so as to enable voice communication therebetween.

9. The gateway of claim 1, in which the connecting resource includes an Interactive Voice Response ("IVR") unit, and in which said coupling by the connecting resource is performed by the IVR.

10. The gateway of claim 9, in which the IVR also includes the robotic peripheral.

11. The gateway of claim 1, in which the asynchronously-configured telephony devices exchange voice information included in multimedia signals, and in which the connecting resource further includes means for exchanging said voice information in said multimedia signals with the robotic peripheral.

12. The gateway of claim 1, in which said coupling by the connecting resource enables multi-party conferences between asynchronously-configured telephony devices.

13. The gateway of claim 1, in which the connecting resource further includes means for providing voice information feeds to be broadcast over a mass medium.

14. The gateway of claim 1, in which the connecting resource and the robotic peripheral are on a common platform.

15. The gateway of claim 1, further comprising means, responsive to the connecting resource, for enabling synchronously-configured telephony devices to exchange, via the connecting resource, voice information with asynchronously-configured telephony devices and the robotic peripheral.

16. The gateway of claim 15, in which the synchronously-configured telephony devices include telephony devices coupled to the connecting resource via the Switched Public Network.

17. The gateway of claim 15, in which the synchronously-configured telephony devices include telephony devices coupled to the connecting resource via a Private Branch Exchange.

18. The gateway of claim 15, in which the synchronously-configured telephony devices include telephony devices coupled to the connecting resource via an Automated Call Distributor.

19. The gateway of claim 15, in which the synchronously-configured telephony devices include telephony devices coupled directly to the connecting resource.

20. A telephony gateway in which a plurality of asynchronously-configured telephony devices are each disposed to exchange voice information according to asynchronous protocols, the gateway comprising:
   a connecting resource,
   the connecting resource including an Interactive Voice Response (IVR) unit disposed to couple first selected ones of the asynchronously-connected telephony devices so as to enable voice communication therebetween;
   means, responsive to the connecting resource, for coupling second selected ones of the asynchronously-connected telephony devices to automated speech resources via the IVR unit so as to enable voice communication therebetween; and
   means, responsive to the connecting resource, for enabling synchronously-configured telephony devices to exchange, via the connecting resource, voice information with asynchronously-configured telephony devices and the automated speech resources.

21. The gateway of claim 20, in which the connecting resource and the IVR unit are on a common platform.

22. The gateway of claim 20, in which the asynchronously-configured telephony devices exchange voice information included in multimedia signals, and in which the connecting resource further includes means for exchanging said voice information in said multimedia signals with the automated speech resources.

23. The gateway of claim 20, in which the synchronously-configured telephony devices include telephony devices coupled to the connecting resource via a resource selected from the group consisting of:
   (A) the Switched Public Network;
   (B) a Private Branch Exchange;
   (C) an Automated Call Distributor; and
   (D) a direct link.

24. The gateway of claim 20, in which the connecting resource is operable to couple asynchronously-configured telephony devices and the automated speech resources over routed data paths so as to enable voice communication therebetween, the routed data paths including travel on at least one routed network selected from the group consisting of:
   (A) the Internet;
   (B) a Wide Area Network other than the Internet; and
   (C) a Local Area Network.

25. A method for enabling an exchange of voice information over asynchronously-configured telephony devices, the steps of the method comprising:
   providing a connecting resource and a robotic voice peripheral;
   establishing one or more originating links between the connecting resource and a corresponding number of asynchronously-configured originating telephony devices, each of said originating telephony devices exchanging voice information over the originating links in an asynchronous data transfer protocol;
   selectively establishing one or more terminating links between the connecting resource and a corresponding number of asynchronously-configured terminating telephony devices, each of said terminating telephony devices exchanging voice information over the terminating links in an asynchronous data transfer protocol;
   selectively coupling ones of the originating links with ones of the terminating links so as to enable voice communications between originating terminating telephony devices thereby coupled; and
   selectively coupling ones of the originating links and ones of the terminating links with said robotic voice peripheral.

26. The method of claim 25, in which the connecting resource and the robotic voice peripheral are on a common platform.

27. The method of claim 26, in which the robotic voice peripheral comprises an Interactive Voice Response (IVR) unit including automated speech resources.

28. The method of claim 25, in which the robotic voice peripheral comprises an Interactive Voice Response (IVR) unit including automated speech resources.

29. The method of claim 25, further including the step of using a network to establish at least one of the originating links, and in which said network is selected from the group consisting of:

(a) the Internet;

(b) a Wide Area Network other than the Internet; and (c) a Local Area Network.

30. The method of claim 25, further including the step of using a network to establish at least one of the terminating links, and in which said network is selected from the group consisting of:

(a) the Internet;

(b) a Wide Area Network other than the Internet; and (c) a Local Area Network.

31. The method of claim 25, in which said coupling step enables originating parties to be in multi-party conferences with terminating parties.

32. The method of claim 25, in which voice information in selected ones of the originating links and the terminating links is included in multimedia signals exchanged in said selected links.

33. The method of claim 25, in which said asynchronous protocols include TCP/IP.

34. A method for enabling an exchange of voice information over asynchronously-configured telephony devices, the steps of the method comprising:

providing a connecting resource, the connecting resource on a common platform with an Interactive Voice Response ("IVR") unit, the IVR unit providing automated speech resources;

establishing one or more originating links between the connecting resource and a corresponding number of asynchronously-configured originating telephony devices, each of said originating telephony devices exchanging voice information over the originating links in an asynchronous data transfer protocol, at least one of said originating links being a TCP/IP link;

disposing the connecting resource to selectively establish one or more terminating links between the connecting resource and a corresponding number of asynchronously-configured terminating telephony devices, each of said terminating telephony devices exchanging voice information over the terminating links in an asynchronous data transfer protocol, at least one of said terminating links being a TCP/IP link;

selectively coupling ones of the originating links with ones of the terminating links so as to enable voice communications between originating terminating telephony devices thereby coupled; and selectively coupling ones of the originating links and ones of the terminating links with the IVR;

wherein voice information in selected ones of the originating links and the terminating links is included in multimedia signals exchanged in said selected links.

\* \* \* \* \*